United States Patent
Chouf et al.

(10) Patent No.: US 8,278,591 B2
(45) Date of Patent: Oct. 2, 2012

(54) CUTTING METHOD USING A LASER HAVING AT LEAST ONE YTTERBIUM-BASED FIBER, IN WHICH AT LEAST THE POWER OF THE LASER SOURCE, THE DIAMETER OF THE FOCUSED BEAM AND THE BEAM QUALITY FACTOR ARE CONTROLLED

(75) Inventors: Karim Chouf, Levallois-Perret (FR); Hakim Maazaoui, Cergy St Christophe (FR); Eric Verna, Boissy l'Aillerie (FR); Françis Briand, Paris (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 1010 days.

(21) Appl. No.: 12/162,440

(22) PCT Filed: Jan. 22, 2007

(86) PCT No.: PCT/FR2007/050673
§ 371 (c)(1),
(2), (4) Date: Oct. 24, 2008

(87) PCT Pub. No.: WO2007/088295
PCT Pub. Date: Aug. 9, 2007

(65) Prior Publication Data
US 2009/0218326 A1   Sep. 3, 2009

(30) Foreign Application Priority Data
Feb. 3, 2006   (FR) ...................................... 06 50382

(51) Int. Cl.
B23K 26/38 (2006.01)
B23K 26/14 (2006.01)
B23K 26/08 (2006.01)
H01S 3/06 (2006.01)

(52) U.S. Cl. ............................ 219/121.72; 219/121.61

(58) Field of Classification Search ........................ 219/121.67–121.72, 121.61
See application file for complete search history.

(56) References Cited

U.S. PATENT DOCUMENTS
4,759,604 A * 7/1988 Utsumi et al. ................ 385/126
(Continued)

FOREIGN PATENT DOCUMENTS
DE   102004024475   12/2005
(Continued)

OTHER PUBLICATIONS

Penn et al, "Trends in Laser Material Processing for Cutting, Welding, and Metal Deposition using Carbon Dioxide, Direct Diode, and Fiber Lasers", Proceedings of SPIE, vol. 5706, pp. 25-37, Mar. 2005.*

(Continued)

Primary Examiner — Samuel M Heinrich
(74) Attorney, Agent, or Firm — Elwood L. Haynes; Allen E. White

(57) ABSTRACT

The invention relates to method for cutting a part using a laser beam, involving the use of laser beam generation means comprising at least one ytterbium-based fibre having a wavelength of between 1 and 4 μm in order to generate the laser beam. The laser beam is selected to have a power of less than 100 kW, a power density of at least 1 MW/cm2, a focused beam diameter of at least 0.1 mm and a quality factor (BPP) of less than 10 mm·mrad.

25 Claims, 3 Drawing Sheets

U.S. PATENT DOCUMENTS

| | | | |
|---|---|---|---|
| 6,208,458 | B1 | 3/2001 | Galvanauskas et al. |
| 7,283,714 | B1 * | 10/2007 | Gapontsev et al. ............ 385/126 |
| 7,369,582 | B2 | 5/2008 | Kumkar et al. |
| 2003/0055413 | A1 | 3/2003 | Altshuler et al. |
| 2003/0189959 | A1 | 10/2003 | Erbert et al. |
| 2007/0119833 | A1 | 5/2007 | Briand et al. |
| 2007/0170162 | A1 * | 7/2007 | Haupt et al. ............. 219/121.72 |

FOREIGN PATENT DOCUMENTS

| | | |
|---|---|---|
| DE | 102004027625 | 1/2006 |
| EP | 0374741 | 6/1990 |
| EP | 1607487 | 12/2005 |
| EP | 1790427 | 5/2007 |
| WO | WO2005053895 A1 * | 6/2005 |

OTHER PUBLICATIONS

Kleine et al, "Pulse Shaping for Micro Cutting Applications of Metals with Fiber Lasers", SPIE vol. 5339, pp. 510-517, 2004.*

Dausinger, "Laser with different wavelengths—implication for various applications," ECLAT 90, vol. 1, 3rd Conference on Laser Treatment of Materials, pp. 1-14.

International Search Report and Written Opinion for PCT/FR2007/050673 mailed Jun. 22, 2007.

French Search Report for FR 0650382.

* cited by examiner

CUTTING METHOD USING A LASER HAVING AT LEAST ONE YTTERBIUM-BASED FIBER, IN WHICH AT LEAST THE POWER OF THE LASER SOURCE, THE DIAMETER OF THE FOCUSED BEAM AND THE BEAM QUALITY FACTOR ARE CONTROLLED

This application is a §371 of International PCT Application PCT/FR2007/050673, filed Jan. 22, 2007.

BACKGROUND

1. Field of the invention

The invention relates to a laser cutting method using an ytterbium-based fiber laser source.

1. Related Art

Laser cutting using a $CO_2$ laser source for generating a laser beam with a wavelength of 10.6 µm, with a power ranging up to 6 kW at the present time, is widely used in the industry as this type of source gives good beam characteristics, namely a good quality factor ($M^2$, BPP, etc.) and a good spatial energy distribution (TEM01*).

It is possible with these $CO_2$ laser sources to cut metals and their alloys, such as aluminum and its alloys, stainless steel, carbon steel, mild steel, etc., or any other nonmetallic material, such as wood, board, ceramics.

However, the cutting speeds that can be achieved and the cutting quality that results therefrom are highly variable, depending on the material to be cut and, moreover, depending on the cutting method parameters adopted, such as the nature of the assist gas, the diameter of the focused beam and the power of the incident laser. In addition, the optical path must necessarily be maintained in an inert atmosphere so as to avoid any contamination and to preserve a medium of constant optical index necessary for good propagation of the beam.

In an attempt to alleviate these problems, it has been proposed to use in laser cutting Nd:YAG laser devices. In this case, the resonator that generates the beam contains a solid-state amplifying medium, which is a neodymium (Nd) rod, and the beam thus obtained is then sent via a optical fiber to the focusing head.

However, this solution is not satisfactory from the industrial standpoint as it gives poor results in terms of cutting quality and cutting speed, not only because of beam quality factors (BPP) unsuitable for laser cutting but also because the transverse energy distribution in the beam is not Gaussian but has a top-hat profile, while beyond the focal point the transverse energy distribution is even random.

The problem that arises is therefore how to provide an improved laser cutting method, which does not have the abovementioned drawbacks and limitations and can achieve, depending on the thickness in question, speeds ranging up to 15 to 20 m/min, or even higher, and good cutting quality, that is to say straight cutting faces, with no burrs and limited roughness.

SUMMARY OF THE INVENTION

The solution of the invention is therefore a laser cutting method in which laser beam generation means comprising at least one ytterbium-containing fiber are used to generate a laser beam for melting the workpiece and thus performing the actual cutting.

More precisely, the invention relates to a method of cutting a workpiece with a laser beam, in which laser beam generation means comprising at least one ytterbium-containing fiber, having a wavelength between 1 and 4 µm, are used to generate the laser beam.

BRIEF DESCRIPTION OF THE FIGURES

Other particulars and advantages will become apparent from reading the following description which is given with reference to the figures in which.

DETAILED DESCRIPTION OF THE INVENTION

Figure 1:
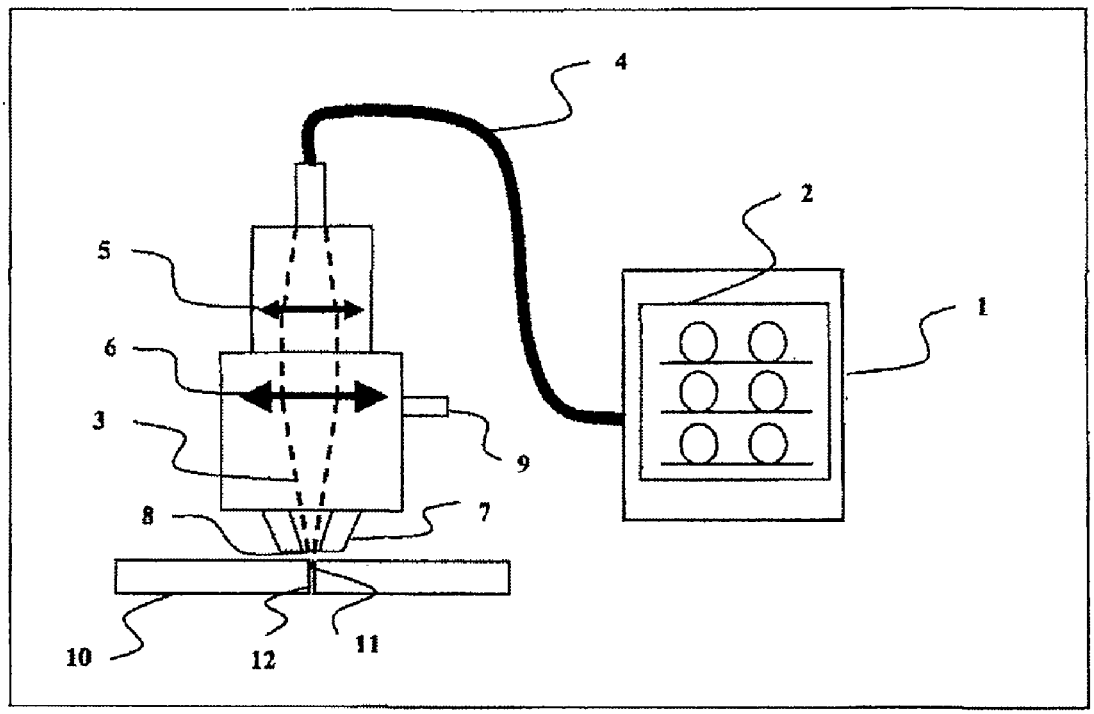
FIG. 1 depicts a schematic of an installation used to cut stainless steel workpieces using a laser beam.

According to the invention, the laser beam is selected so as to have:
- a power of less than 100 kW;
- a power density of at least 1 $MW/cm^2$;
- a focused beam diameter of at least 0.1 mm; and
- a quality factor (BPP) of less than 10 mm·mrad.

In addition, according to the invention, the laser beam generation means comprise at least one exciter element, preferably several exciter elements, which cooperate with at least one excited element, also called amplifying medium, in order to generate the laser beam. The exciter elements are preferably several laser diodes, whereas the excited element(s) is (are) preferably a silica fiber with an ytterbium core or preferentially a plurality of such fibers.

Furthermore, within the context of the invention, the terms "laser beam generation means" and "resonator" will be used indiscriminately. This type of laser source is usually called a "fiber" laser or "ytterbium fiber" laser source since the amplifying medium is an array of particular optical fibers, the core of which is based on ytterbium.

Depending on the case, the method of the invention may include one or more of the following features:
- the fiber(s) is (are) formed from an ytterbium-doped core clad with silica;
- the laser beam generated by the ytterbium-based fiber has a wavelength of between 1.04 and 5 µm, preferably between 1.07 and 1.1 µm and more preferably equal to 1.07 µm;
- the laser beam has a power of between 01 and 40 kW, preferably between 0.5 and 15 kW;
- the laser beam is continuous or pulsed, preferably continuous;
- the cutting speed is between 0.1 and 20 m/min, preferably from 1 to 15 m/min;
- the assist gas for the laser beam is chosen from nitrogen, helium, argon, oxygen, $CO_2$ and mixtures thereof, and it optionally also contains one or more additional compounds chosen from $H_2$ and $CH_4$;
- more generally, the assist gas pressure is between about 0.1 bar and 25 bar, and is chosen according to the thickness to be cut;
- the diameter of the gas injection orifice is between 0.5 and 5 mm, typically between 1 and 3 mm;

the quality factor (BPP) of the laser is between 1 and 8 mm·mrad, preferably between 2 and 6 mm·mrad;

the laser beam has a power density between 1.5 and 20 MW/cm$^2$;

the focused beam diameter is between 0.1 mm and 0.50 mm, preferably between 0.13 and 0.40 mm;

the laser beam has a Raleigh length (Zr) of between 1 and 10 mm, preferably between 2 and 7 mm;

the beam is used with an angular aperture (θ) of between 0.25° and 5° and an angle (α) of between 1.25° and 8°, corresponding to the angle defines by the diameter (2$W_0$) of the focused laser beam divided by the thickness (E) of the metal sheet or plate, these being such that the sum of the angles (α+θ) is between 1.5° and 8°; and the workpiece to be cut has a thickness of between 0.25 and 30 mm, preferably between 0.40 and 20 mm.

In fact, the main characteristics of the laser radiation that come into play in the cutting process are the wavelength of the laser, the quality factor ($M^2$, K, BPP) of the beam, the diameter of the beam measured at the source exit, the incident power of the laser and the method of focusing the laser near the surface of the material to be cut.

The wavelength of ytterbium "fiber" laser sources is generally close to that of Nd:YAG lasers, namely around 1.07 µm.

In general, for this type of ytterbium fiber laser source, the BPP (Beam Parameter Product) is used to characterize the quality of the beam. The BPP is defined as the product of the beam diameter at the beam waist and its divergence angle. The BPP is expressed in mm·mrad. The smaller the BPP, the better the beam quality.

From an industrial standpoint, these ytterbium fiber laser sources have the advantage of being propagated right to the focusing system via an optical fiber close to the work zone, while still maintaining good beam quality. The available beam diameter at the source exit is then equal to the useful diameter of the optical fiber that transports it.

The power levels and quality factors of these beams are satisfactory for the laser cutting process, in particular in terms of cutting speed and cutting quality. The power levels available with this type of source are between 100 W and 40 kW and their quality factors (BPP) vary between 0.3 mm·mrad and 15 mm·mrad. Furthermore, the diameter of the propagating optical fiber changes with the laser power that it has to deliver. The higher the power, the larger the fiber diameter.

Thus, for example for a power of 2 kW, the fiber used will have a diameter of 50 µm and a BPP of 2 mm·mrad, whereas for 4 kW, its diameter will be 100 µm and its BPP 4 mm·mrad.

Moreover, irrespective of the type of source used, the laser beam output by the source must be focused by focusing means, such as a lens or a special optical system, for example mirrors. Depending on the properties of the lens used, the characteristics of the focused beam change, resulting in the laser cutting performance being modified. The choice of a lens and of its implementation for focusing the beam forms part of the general knowledge of those skilled in the art.

In practice, the BPP of the fiber laser source may be varied by modifying the number of elementary fibers contained in the source generating the laser beam. This is because each of the elementary fibers gives in general a monomode beam with a BPP of around 0.3 mm·mrad. Consequently, the number of fibers and the way they are "bundled" together give different BPP values. These elementary fiber lasers are, in turn, injected into a propagating optical fiber by various means. The larger the diameter of this propagating optical fiber, the higher the BPP of the output beam. Thus, for a given power, it is possible to vary the BPP over quite a wide range and therefore to choose the BPP desired, namely a BPP according to the invention of less than 10 mm·mrad, preferably between 1 and 8 mm·mrad and even more preferably between 2 and 6 mm·mrad.

This beam is generally focused on the material to be cut by using two optical lenses, the characteristics of which are determined empirically by those skilled in the art so as to obtain a focal spot of the desired diameter on the workpiece, namely a focused beam diameter of at least 0.1 mm. This diameter is in general dependent on the exit diameter of the propagating fiber, on the focal lengths chosen and on the BPP at the exit of the fiber.

Finally, the average power density is the ratio of the power of the laser beam to the area of the focal spot obtained with this laser beam, and it therefore depends on the diameter of the focal spot. Determining these parameters poses no particular difficulty to a person skilled in the art.

Figure 2:
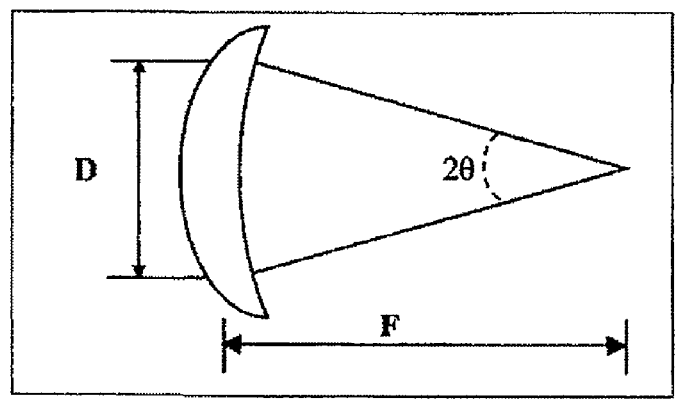
FIG. 2 depicts a diagram where the angular aperture (2θ) is defined as $\tan(\theta)=\frac{1}{2}D/F$ where D is the diameter of the beam incident at the surface of the lens and F is its focal length.

It follows that a focused laser beam always possesses an angular aperture (2θ) defined as follows:

$$\tan(\theta) = \tfrac{1}{2} D/F$$

where D is the diameter of the beam incident at the surface of the lens and F is its focal length, as shown diagrammatically in FIG. 2.

The performance of the laser cutting process is directly dependent on the absorption of the laser energy by the material. This absorption is a function of the nature of the material to be cut, of the characteristics of the laser beam, especially the wavelength, as explained above, but also the angle of incidence between the beam and the material to be cut, and its polarization.

Figure 5:
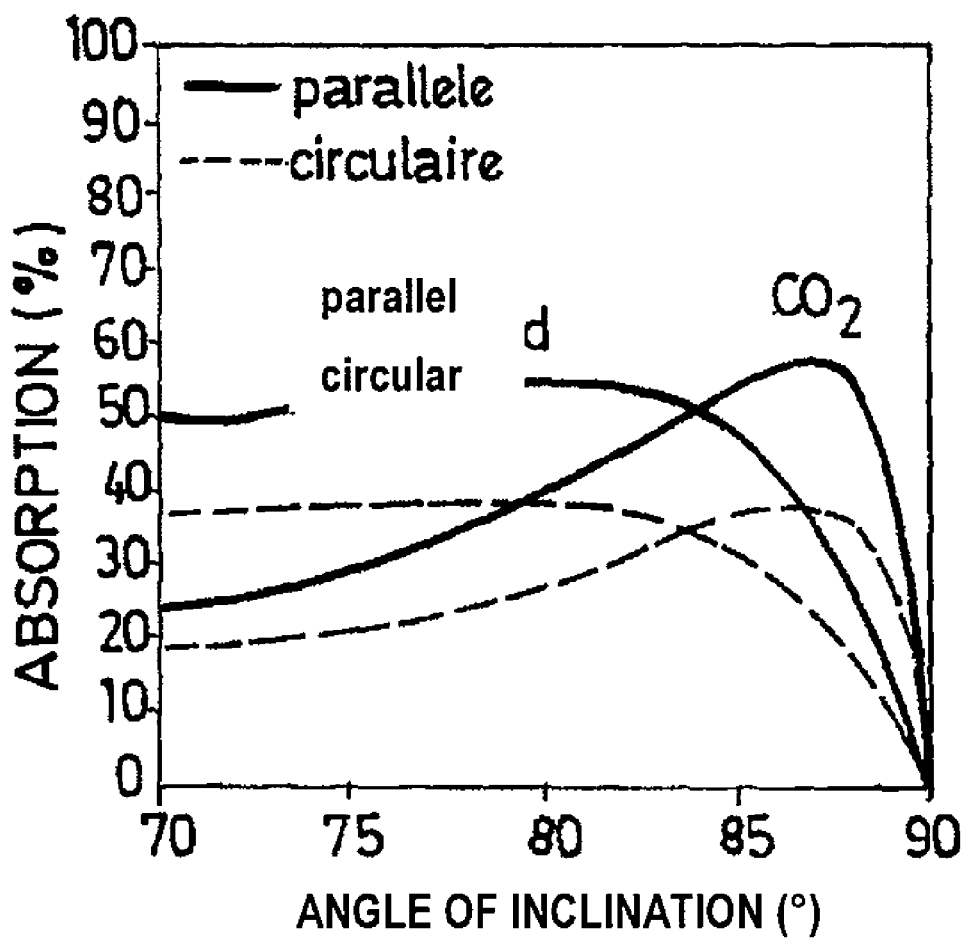
FIG. 5 depicts the variation in the absorption of a $CO_2$ laser beam and an Nd:YAG laser beam as a function of its angle of incidence and its polarization.

Thus, FIG. 5 shows the variation in the absorption of a $CO_2$ laser beam and an Nd:YAG laser beam as a function of its angle of incidence and its polarization, as explained in "*Laser with different wavelengths—implication for various applications*" by F. Dausinger, Stuttgart University, ECLAT 90, Vol. 1, 3rd Conference on Laser Treatment of Materials, pp 1-14.

The 1.07 µm wavelength of an ytterbium fiber laser, being very close to the 1.06 µm wavelength of an Nd:YAG laser suggests a maximum energy absorption similar to Nd:YAG, but with a different angle of incidence from that of a $CO_2$ laser.

During the cutting process, a stationary boundary zone is established between the solid metal and the liquid metal, called the "cutting front". The front established depends on the rate of advance of the beam and on its characteristics, with an angle α that does not vary over the entire length of the cut.

Figure 3:
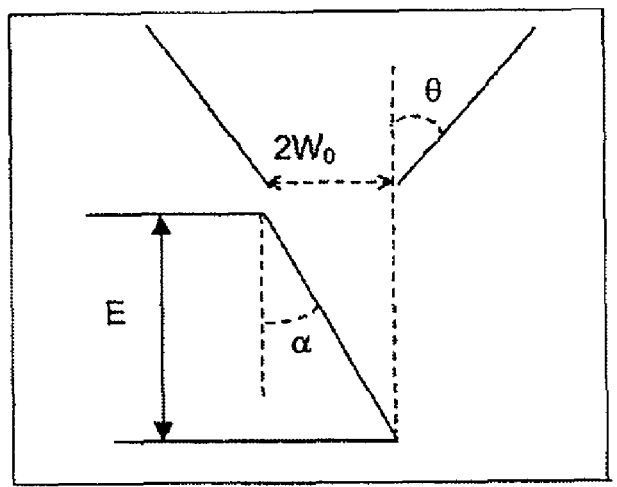
FIG. 3 depicts a diagram of the maximum angle α.

The maximum angle α, shown in FIG. 3, is defined as a theoretical quantity corresponding to the angle made by the front of molten metal during the cutting, at the maximum chosen cutting speed, such that:

$$\tan(\alpha) = 2 W_0/E$$

where $2W_0$ corresponds to the waist of the focused beam and E corresponds to the thickness of the workpiece to be cut.

The greater the thickness (E) of the metal sheet or plate to be cut, for a given laser beam, the smaller the angle α. The larger the focal spot, for a given thickness of material to be cut, the larger the angle α.

The maximum angle of incidence of the beam relative to the front is therefore defined by the angle (α+θ). This angle corresponds as it were to the angle of the extreme ray of the laser beam with the cutting front.

Another important aspect in the cutting process is the capability of distributing, without a large variation, the laser energy within the core of the thickness of the material. The Raleigh length, or depth of field, is the distance from the waist along the propagation axis of the beam over which the beam diameter does not increase by more than 5%.

It is considered that the energy distribution does not vary significantly within this region and that this value must be linked to the thickness of the material to be cut.

The Raleigh distance Zr can be linked to the beam quality factor BPP via the following equation:

$$Zr = W_0^2/\text{BPP}$$

in which $W_0$ is the diameter of the beam at the waist.

It is therefore of paramount importance to take into account the quality factor and therefore the Raleigh length if it is desired to improve the cutting method.

Thus, it will be understood that it is also necessary to take into account the diameter φ of the focused laser beam in order to hope to improve the cutting process, since this parameter has a direct influence on the angle α and consequently on the absorption of the beam through the sum α+θ.

Starting from this point, considering most particularly these various parameters, comparative trials, set out below, were carried out by adopting in particular the parameters and conditions given in the table below.

7.5 mm, as given in the table below. Before striking the workpiece 10, the beam 3 passes axially through the laser head 5, which is equipped with a nozzle 7 having an axial exit orifice 8 located facing the workpiece 10 to be cut, the beam 3 and the assist gas passing through said orifice. The orifice of the nozzle may be between 0.5 mm and 5 mm, preferably between 1 mm and 3 mm.

The laser head 5 itself is fed with assist gas via a gas inlet 9, for example an inert gas such as nitrogen, argon, helium or a mixture of several of these gases, or else an active gas such as, for example, oxygen, or even active gas/inert gas mixtures, the choice of gas to be used depending on the material to be cut.

The pressurized assist gas is used to remove the molten metal from the kerf 12 being formed in the workpiece 10, as the workpiece undergoes a relative displacement with respect to the laser head 5 along the desired cutting path. The reverse solution, consisting in moving the cutting head while keeping the workpiece stationary, gives the same result.

The values of the other parameters (Zr, BPP, angles, etc.) are given in the following table.

TABLE

| Thickness E (mm) | Focal length (mm) | Fiber diameter (μm) | θ (°) | α (°) | α + θ (°) | Focused spot diameter (mm) | Zr (mm) | Power density (MW/cm²) | BPP (mm · mrad) |
|---|---|---|---|---|---|---|---|---|---|
| 1.5 | 127 | 50 | 1.5 | 5.7 | 7.2 | 0.15 | 2.8 | 11.5 | 2 |
| 2 | 127 | 50 | 1.5 | 4.6 | 6.1 | 0.16 | 3 | 10 | 2.1 |
| 2 | 190.5 | 50 | 1 | 5.9 | 6.9 | 0.21 | 5.8 | 6 | 1.8 |
| 4 | 95.25 | 100 | 2.2 | 3.2 | 5.4 | 0.22 | 2.9 | 5.2 | 4.3 |
| 4 | 127 | 100 | 1.7 | 4 | 5.7 | 0.28 | 4.8 | 3.2 | 4.1 |
| 4 | 190.5 | 100 | 1.4 | 4.9 | 6.3 | 0.34 | 6.9 | 2.1 | 4.3 |
| 6 | 228.6 | 100 | 1.2 | 3.9 | 5.1 | 0.40 | 9.8 | 1.5 | 4.2 |

For a further understanding of the nature and objects for the present invention, reference should be made to the detailed description, taken in conjunction with the accompanying figures, in which like elements are given the same or analogous reference numbers.

During these trials, the installation shown schematically in FIG. 1 was used to cut a stainless steel workpiece 10 using a laser beam 3. This installation comprises a 2 kW laser source 1 with a resonator 2 or laser beam generation means, comprising a silica fiber with an ytterbium-doped core for generating a laser beam 3 of 1.07 μm wavelength.

The beam 3 propagates through beam-conveying means 4, such as an optical fiber made of fused silica with a diameter of 50 μm or 100 μm, depending on the case, as far as the zone 11 of interaction between the beam 3 and the workpiece 10 where the beam strikes the workpiece to be cut and melts the constituent material of said workpiece, thus progressively forming the kerf by the movement of the front.

On exiting from this fiber 4, the laser beam 3 possesses particular optical characteristics and a quality factor (BPP) of 2 or 4.2 mm·mrad (±0.2 mm·mrad), respectively, depending on the fiber diameter in question. The beam 3 is then collimated using an optical collimator 5 equipped with a collimation doublet made of fused silica coated so as to limit the divergence of the beam exiting the fiber and to make the laser beam parallel.

According to the principle shown diagrammatically in FIGS. 2 and 3, the parallel beam 3 is then focused onto or into the workpiece 10 to be cut, with a thickness E, by a coated fused-silica lens 6 having a focal length of between 5 mm and The cutting trials were carried out on stainless steel workpieces having thicknesses between 1.5 mm and 6 mm.

The gas used was nitrogen, this being injected into the zone of interaction between the beam and workpiece with pressures varying between 0.6 and 25 bar, through a laser cutting nozzle having an orifice of 1.5 mm diameter for the 1.5 and 2 mm thicknesses and of 2 mm diameter for the 4 and 6 mm thicknesses.

Figure 4:
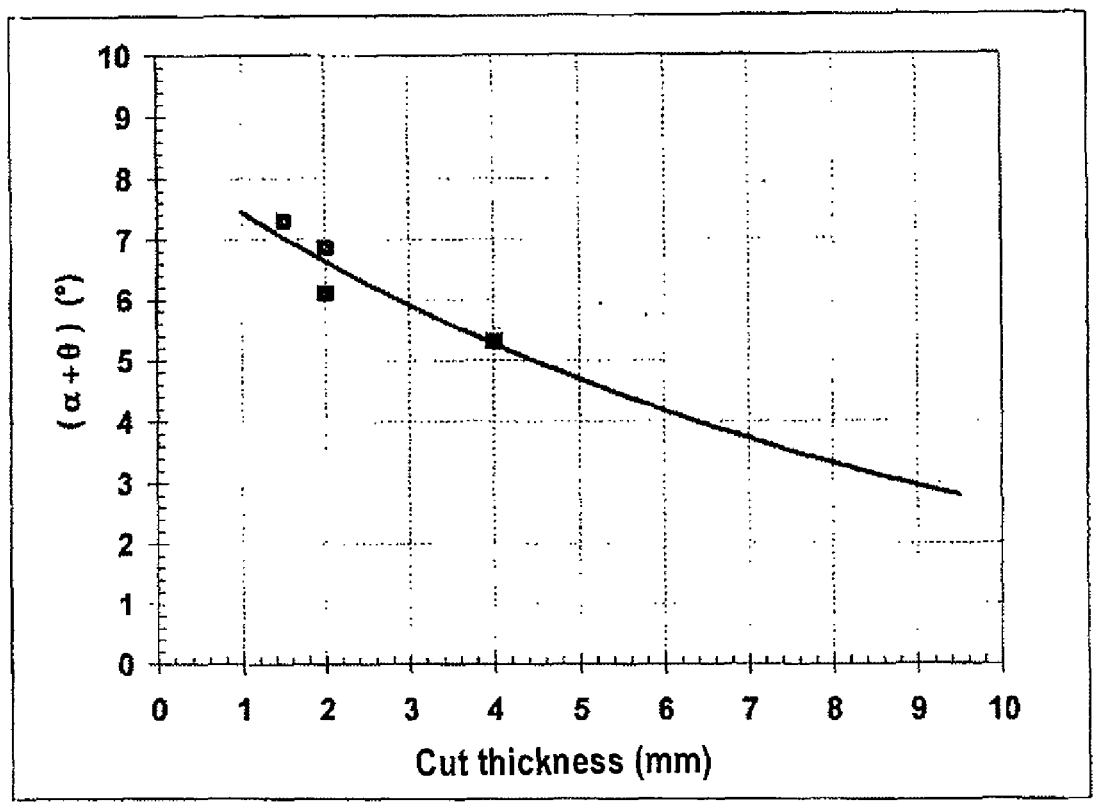
FIG. 4 depicts the results obtained from cutting trials carried out on stainless steel workpieces.

The results obtained, having given good results in terms of cutting quality, have been plotted in FIG. 4. It may be seen that the curve extrapolated beyond the points for the results obtained demonstrates that there exists a close relationship between the sum of the angles (α+θ) plotted on the y-axis and the thickness (E) of the workpiece to be cut, plotted on the x-axis.

In other words, the results obtained show that the cutting with a laser beam source of the ytterbium "fiber" type, with a 1.07 μm wavelength, are satisfactory only if all or some of the following conditions are fulfilled:
  the power of the beam is between 1 and 100 kW;
  the focused power density is at least 1 MW/cm², preferably between 1 MW/cm² and 100 MW/cm², advantageously at least 3 MW/cm² or even at least 3.2 MW/cm²;
  the diameter (φ) of the focused laser beam is at least 0.1 mm, preferably from 0.15 to 0.3 mm;
  the quality factor (BPP) is less than 10 mm·mrad, preferably from 1.5 to 6 mm·mrad;
  the sum of the angles (α+θ) must follow the curve of variation below, namely an angle of between 1° and 8° for plate with a thickness between 1 mm and 15 mm; and the Raleigh length Zr is between 0.1 mm and 40 mm and a Zr value is advantageously chosen corresponding to at least half the thickness E of the metal sheet or plate to be cut.

Thus, to give an example, mention may be made of the last two sets of parameters presented in the table that provided cuts having burrs. Analysis shows that they do not meet the abovementioned criteria, in particular there is no correspondence between the angle ($\alpha+\theta$) and the cut thickness, and too low a power density.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of cutting a workpiece with a laser beam, wherein laser beam generation means comprising at least one ytterbium-containing fiber and having a wavelength between 1 and 4 μm, are used to generate the laser beam, and wherein the laser beam is selected so as to have:
    a power of less than 100 kW;
    a power density of at least 1 MW/cm$^2$;
    a focused beam diameter of at least 0.1 mm; and
    a beam parameter product (BPP) of less than 10 mm·mrad.

2. The method of claim 1, wherein the fiber is formed from an ytterbium-doped core clad with silica.

3. The method of claim 1, wherein the laser beam generated by the ytterbium-based fiber has a wavelength of between 1.04 and 3 μm.

4. The method of claim 3 wherein the laser beam generated by the ytterbium-based fiber has a wavelength of about 1.07 μm.

5. The method of claim 1, wherein the quality factor (BPP) of the laser is between 1 and 8 mm·mrad.

6. The method of claim 5 wherein the quality factor (BPP) of the laser is between 2 and 6 mm·mrad.

7. The method of claim 1, wherein the laser beam has a power of between 0.1 and 40 kW.

8. The method of claim 7, wherein the laser beam has a power of between 0.5 and 15 kW.

9. The method of claim 1, wherein the laser beam has a power density between 1.5 and 20 MW/cm$^2$.

10. The method of claim 1, wherein the focused beam diameter is between 0.1 mm and 0.50 mm.

11. The method of claim 10, wherein the focused beam diameter is between 0.13 and 0.40 mm.

12. The method of claim 1, wherein the laser beam has a Raleigh length (Zr) of between 1 and 10 mm.

13. The method of claim 12, wherein the laser beam has a Raleigh length (Zr) of between 2 and 7 mm.

14. The method of claim 1, wherein the beam is used with an angular aperture ($\theta$) of between 0.25° and 5° and an angle $\alpha$ of between 1.25° and 8°, corresponding to the angle defines by the diameter ($2W_0$) of the focused laser beam divided by the thickness (E) of the metal sheet or plate, these being such that the sum of the angles ($\alpha+\theta$) is between 1.5° and 8°.

15. The method of claim 1, wherein the assist gas for the laser beam is chosen from nitrogen, helium, argon, oxygen, $CO_2$ and mixtures thereof, and optionally also contains one or more additional compounds chosen from $H_2$ and $CH_4$.

16. The method of claim 1, wherein the workpiece to be cut has a thickness of between 0.25 and 30 mm.

17. The method of claim 16, wherein the workpiece to be cut has a thickness of between 0.40 and 20 mm.

18. The method of claim 2, wherein the laser beam generated by the ytterbium-based fiber has a wavelength of between 1.04 and 3 μm.

19. The method of claim 18, wherein the quality factor (BPP) of the laser is between 1 and 8 mm·mrad.

20. The method of claim 19, wherein the laser beam has a power of between 0.1 and 40 kW and a power density between 1.5 and 20 MW/cm$^2$.

21. The method of claim 20, wherein the focused beam diameter is between 0.1 mm and 0.50 mm.

22. The method of claim 21, wherein the laser beam has a Raleigh length (Zr) of between 1 and 10 mm.

23. The method of claim 22, wherein the beam is used with an angular aperture ($\theta$) of between 0.25° and 5° and an angle $\alpha$ of between 1.25° and 8°, corresponding to the angle defines by the diameter ($2W_0$) of the focused laser beam divided by the thickness (E) of the metal sheet or plate, these being such that the sum of the angles ($\alpha+\theta$) is between 1.5° and 8°.

24. The method of claim 23, wherein the assist gas for the laser beam is chosen from nitrogen, helium, argon, oxygen, $CO_2$ and mixtures thereof, and optionally also contains one or more additional compounds chosen from $H_2$ and $CH_4$.

25. The method of claim 24, wherein the workpiece to be cut has a thickness of between 0.25 and 30 mm.

* * * * *